United States Patent
Dimassimo et al.

(10) Patent No.: US 12,353,461 B2
(45) Date of Patent: *Jul. 8, 2025

(54) METHODS, SYSTEMS, AND COMPUTER-READABLE MEDIA FOR SEMANTICALLY ENRICHING CONTENT AND FOR SEMANTIC NAVIGATION

(71) Applicant: Open Text SA ULC, Halifax (CA)

(72) Inventors: Pascal Dimassimo, Montreal (CA); Steve Pettigrew, Montreal (CA); Martin Brousseau, Montreal (CA); Charles-Olivier Simard, Montreal (CA); Eric Williams, Montreal (CA); Francis Lacroix, Montreal (CA); Alex Dowgailenko, Montreal (CA); Agostino Deligia, Montreal (CA); Jean-Michel Texier, Montreal (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,511

(22) Filed: May 23, 2023

(65) Prior Publication Data
US 2023/0297602 A1    Sep. 21, 2023

Related U.S. Application Data

(60) Continuation of application No. 17/347,815, filed on Jun. 15, 2021, now Pat. No. 11,698,920, which is a
(Continued)

(51) Int. Cl.
*G06F 16/00* (2019.01)
*G06F 16/248* (2019.01)
(Continued)

(52) U.S. Cl.
CPC ......... *G06F 16/338* (2019.01); *G06F 16/248* (2019.01); *G06F 16/316* (2019.01);
(Continued)

(58) Field of Classification Search
CPC ...... G06F 16/338; G06F 16/316; G06F 16/36; G06F 16/3344; G06F 16/3325; G06F 16/951; G06F 16/248
(Continued)

(56) References Cited

U.S. PATENT DOCUMENTS 7,092,870 B1    8/2006  Chen
11,698,920 B2   7/2023  Dimassimo
(Continued)

OTHER PUBLICATIONS

Notice of Allowance for U.S. Appl. No. 17/745,525 issued by the U.S. Patent and Trademark Office, mailed Jan. 4, 2024, 5 pgs.
(Continued)

*Primary Examiner* — Michelle N Owyang
(74) *Attorney, Agent, or Firm* — Sprinkle IP Law Group (57) ABSTRACT

Methods, systems and computer-readable media enable various techniques related to semantic navigation. One aspect is a technique for displaying semantically derived facets in the search engine interface. Each of the facets comprises faceted search results. Each of the faceted search results is displayed in association with user interface elements for including or excluding the faceted search result as additional search terms to subsequently refine the search query. Another aspect automatically infers new metadata from the content and from existing metadata and then automatically annotates the content with the new metadata to improve recall and navigation. Another aspect identifies semantic annotations by determining semantic connections between the semantic annotations and then dynamically generating a topic page based on the semantic connections.

20 Claims, 9 Drawing Sheets

Related U.S. Application Data continuation of application No. 16/371,974, filed on Apr. 1, 2019, now Pat. No. 11,042,573, which is a continuation of application No. 15/059,125, filed on Mar. 2, 2016, now Pat. No. 10,282,372, which is a continuation of application No. 14/079,406, filed on Nov. 13, 2013, now Pat. No. 10,331,714, which is a division of application No. 13/189,048, filed on Jul. 22, 2011, now Pat. No. 9,298,816.

(51) Int. Cl.
*G06F 16/31* (2019.01)
*G06F 16/332* (2019.01)
*G06F 16/334* (2025.01)
*G06F 16/338* (2019.01)
*G06F 16/36* (2019.01)
*G06F 16/951* (2019.01)

(52) U.S. Cl.
CPC ...... *G06F 16/3325* (2019.01); *G06F 16/3344* (2019.01); *G06F 16/36* (2019.01); *G06F 16/951* (2019.01)

(58) Field of Classification Search
USPC .................................................. 707/600–899
See application file for complete search history.

(56) References Cited

U.S. PATENT DOCUMENTS

| | | | |
|---|---|---|---|
| 11,977,570 B2 | 5/2024 | Dimassimo | |
| 2009/0063473 A1* | 3/2009 | Van Den Berg | G06F 16/3344 707/999.005 |
| 2009/0112841 A1* | 4/2009 | Devarakonda | G06F 16/36 707/999.005 |
| 2009/0119572 A1* | 5/2009 | Koivunen | G06F 16/9562 707/999.103 |
| 2010/0195975 A1 | 8/2010 | Issa | |
| 2011/0125764 A1* | 5/2011 | Carmel | G06F 16/3338 707/E17.014 |
| 2011/0131210 A1* | 6/2011 | Bierner | G06F 16/38 707/E17.089 |
| 2012/0254162 A1* | 10/2012 | Asadullah | G06F 16/3331 707/E17.069 |

OTHER PUBLICATIONS

Final Office Action issued in U.S. Appl. No. 17/745,525, mailed Jun. 23, 2023, 45 pages.

\* cited by examiner

Enter Key Words to Search:

"Montreal Canadiens"   🔍 Advanced Search

*There are 3034 results*   ▼ In the past 30 days

| REFINE YOUR SEARCH | ? |
|---|---|
| Themes | |
| Hockey (2436) | + - |
| Soccer (167) | + - |
| Baseball (109) | + - |
| More | |
| People | |
| Carey Price (989) | + - |
| P.K. Subban (654) | + - |
| Jacques Martin (301) | + - |
| More | |
| Organizations | |
| Canadiens (711) | + - |
| NHL (554) | + - |
| Molson (80) | + - |
| More | |
| Geographic Locations | |
| Montreal (1006) | + - |
| Quebec (987) | + - |
| More | |
| Types of Documents | |
| Articles (937) | + - |
| Blogs (198) | + - |
| More | |

*Canadiens Beat Bruins 3-2 in OT to Take Series in Five Games*
Subban scores in OT as Habs clinch series 4-1.
*www.hockeynews.com*

*Habs to Face Red Wings in Conference Finals*
Game 1 of the Eastern Conference Finals will take place on Saturday night at the Bell Centre.
*www.nhl.com*

*Habs Win to Advance*
Habs win in OT to advance to next round.
*www.gazette.ca*

*Habs Beat Bruins in Five*
Montreal wins three in a row to knock out their longstanding rivals the Boston Bruins.
*www.cbcsports.ca*

*Subban's OT goals sinks Bruins*
P.K. Subban's goal at 4:31 of the first overtime period gave the Habs the win over the Bruins.
*www.tsn.com*

*Bruins coach complains about officiating in Game 5*
Boston Bruins Head Coach Claude Julien complained about the officiating after Game 5, saying that his team spent the whole night in the penalty box.
*www.torontostar.ca*

*Habs Will Beat Red Wings in Six*
If Price and Subban keep playing that well, I think the Habs will win in six games.
*www.hockeyblog.com*

FIG. 4

| Enter Key Words to Search: | |
|---|---|
| "Montreal Canadiens" | |
| *There are 989 results* | |

| REFINE YOUR SEARCH | ? |
|---|---|

Your selections

| Included + | |
|---|---|
| Carey Price | x |

Themes

| Hockey (765) | + | - |
|---|---|---|
| Soccer (72) | + | - |
| Baseball (21) | + | - |
| More | | |

People

| P.K. Subban (201) | + | - |
|---|---|---|
| Jacques Martin (98) | + | - |
| More | | |

Organizations

| Canadiens (699) | + | - |
|---|---|---|
| NHL (321) | + | - |
| Molson (17) | + | - |
| More | | |

Geographic Locations

| Montreal (340) | + | - |
|---|---|---|
| Quebec (187) | + | - |
| More | | |

Types of Documents

| Articles (300) | + | - |
|---|---|---|
| Blogs (55) | + | - |
| More | | |

🔍 Advanced Search

▼ In the past 30 days

*Carey Price Lifts Canadiens in Game 5 OT Win*
Carey Price stopped 42 shots as the Habs clinch their series 4-1.
*www.hockeynews.com*

*Price Eager to Face Red Wings in Conference Finals*
Habs Goalie Carey Price said he's eager for Game 1 of the Eastern Conference Finals.
*www.nhl.com*

*Price Shuts Out Bruins as Habs Advance*
Price was solid nets as the Habs win in OT to advance to next round.
*www.gazette.ca*

*Habs Beat Bruins in Five*
Montreal wins three in a row to knock out their longstanding rivals the Boston Bruins. Carey Price...
*www.cbcsports.ca*

*Price Key to Victory Over Bruins*
After P.K. Subban's goal at 4:31 of the first overtime period gave the Habs the win over the Bruins, Carey Price was asked what he thought was the turning
*www.tsn.com*

*Bruins Admit Price was Difference*
Boston Bruins Head Coach Claude Julien said goaltending made the difference. Habs goalie Carey..
*www.ottawacitizen.ca*

*Habs Will Beat Red Wings in Six*
If Price and Subban keep playing that well, I think the Habs will win in six games.
*www.hockeyblog.com*

*FIG. 5*

Enter Key Words to Search:
"Montreal Canadiens"
*There are 121 results*

| REFINE YOUR SEARCH | ? |

Your selections

Included +
Carey Price [x]
Canadiens [x]
Excluded -
P.K. Subban [x]

Themes

Hockey (99) [+] [-]
Soccer (12) [+] [-]
Baseball (5) [+] [-]
*More*

People

Jacques Martin (18) [+] [-]
Mike Cammalleri (15) [+] [-]
*More*

Organizations

NHL (80) [+] [-]
Molson (1) [+] [-]
*More*

Geographic Locations

Montreal (76) [+] [-]
Quebec (32) [+] [-]
*More*

Types of Documents

Articles (110) [+] [-]
Blogs (33) [+] [-]
*More*

🔍 Advanced Search

▼ In the past 30 days

*Carey Price Lifts Canadiens in Game 5 OT Win*
Carey Price stopped 42 shots as the Habs clinch their series 4-1.
*www.hockeynews.com*

*Price Eager to Face Red Wings in Conference Finals*
Habs Goalie Carey Price said he's eager for Game 1 of the Eastern Conference Finals.
*www.nhl.com*

*Price Shuts Out Bruins as Habs Advance*
Price was solid nets as the Habs win in OT to advance to next round.
*www.gazette.ca*

*Habs Beat Bruins in Five*
Montreal wins three in a row to knock out their longstanding rivals the Boston Bruins. Carey Price...
*www.cbcsports.ca*

*Price Key to Victory Over Bruins*
After P.K. Subban's goal at 4:31 of the first overtime period gave the Habs the win over the Bruins, Carey Price was asked what he thought was the turning
*www.tsn.com*

*Bruins Admit Price was Difference*
Boston Bruins Head Coach Claude Julien said goaltending made the difference. Habs goalie Carey..
*www.ottawacitizen.ca*

*Habs Will Beat Red Wings in Six*
If Price and Subban keep playing that well, I think the Habs will win in six games.
*www.hockeyblog.com*

METHODS, SYSTEMS, AND COMPUTER-READABLE MEDIA FOR SEMANTICALLY ENRICHING CONTENT AND FOR SEMANTIC NAVIGATION

CROSS-REFERENCE TO RELATED APPLICATIONS

This application is a continuation of, and claims a benefit of priority under 35 U.S.C. § 120 from, U.S. patent application Ser. No. 17/347,815, filed Jun. 15, 2021, issued as U.S. Pat. No. 11,698,920, which is a continuation of, and claims a benefit of priority from, U.S. patent application Ser. No. 16/371,974, filed Apr. 1, 2019, issued as U.S. Pat. No. 11,042,573, which is a continuation of, and claims a benefit of priority from, U.S. patent application Ser. No. 15/059,125, filed Mar. 2, 2016, issued as U.S. Pat. No. 10,282,372, which is a continuation of, and claims a benefit of priority from, U.S. patent application Ser. No. 14/079,406, filed Nov. 13, 2013, issued as U.S. Pat. No. 10,331,714, which is a divisional of, and claims a benefit of priority from, U.S. patent application Ser. No. 13/189,048, filed Jul. 22, 2011, issued as U.S. Pat. No. 9,298,816. All applications listed in this paragraph are hereby incorporated by reference as if set forth herein in their entireties, including all appendices attached thereto.

TECHNICAL FIELD

The disclosure relates generally to computer systems and information technology and, in particular, to content management and content searching based on semantics.

BACKGROUND

Conventional techniques for annotating, managing and searching content are generally limited to keyword searching and manually annotated meta tags. Frequently keyword searches yield large numbers of hits with only marginal actual relevance. The problem of locating information remains a daunting challenge.

Semantics-based technologies represent one promising avenue for addressing this challenge. Here, semantics refers to the explicit or derived (inferred) meaning provided by a fragment of information. At the document level, this meaning can be factual information like "J. Doe is the CEO of Acme Corp." or a piece of information that is inferred from the context like "Acme is a company" or "This article is about mergers & acquisitions." At the inter-document level, the semantic information gathered at the document level can be reused by the computer system to help derive information at a higher level. For example: "In the last month, there has been a trend showing negative criticism of Acme Corp."

Some examples of semantic analysis techniques are disclosed in US 2011/0082863 (Chang et al.) and US 2010/0312743 (Thompson et al.). Some examples of semantic search engines are disclosed in US 2007/0124263 (Katariya et al.), US 2010/0036797 (Wong et al.), US 2011/0072021 (Lu et al.) and US 2010/0268702 (Wissner et al.). Some semantic annotation techniques are disclosed in US 2008/0221874 (Cao et al.). An indexing technique is disclosed in US 2009/0063550 (Van den Berg et al.). A text categorization method and apparatus are disclosed in U.S. Pat. No. 7,356,461 (Tremblay et al.). Various faceted search and display techniques are disclosed in U.S. Pat. No. 7,774,383 (Acevedo-Aviles et al.), U.S. Pat. No. 7,152,064 (Bourdoncle et al.), US 2010/0198837 (Wu et al.), US 2009/0106244 (Dash et al.), US 2007/0185836 (Handy-Bosma et al.), and US 2009/0234849 (Erera et al.). Each of these documents are hereby incorporated by reference.

BRIEF DESCRIPTION OF THE DRAWINGS

Further features and advantages of embodiments disclosed herein will become apparent from the following detailed description, taken in combination with the appended drawings, in which.

It will be noted that throughout the appended drawings, like features are identified by like reference numerals.

SUMMARY

The invention generally provides novel methods, systems, and computer-readable media that provide improvements for generating semantically-enriched content and for semantic navigation.

One aspect of the invention provides a method of displaying search results on a computing device. The method entails receiving search results in response to a search query, displaying a list of search results in a search engine interface and displaying a plurality of facets in the search engine interface. Each of the facets is derived from explicit editorial metadata or inferred semantic annotations and comprises faceted search results. Each of the faceted search results is displayed in association with user interface elements for including or excluding the faceted search result as additional search terms to subsequently refine the search query.

Another aspect of the invention provides a method of presenting content on a computing device. The method entails identifying a plurality of semantic annotations for content, determining one or more semantic connections between the semantic annotations, and dynamically generating a topic page based on the one or more semantic connections.

Yet another aspect of the invention provides a method, performed by a computing device, for annotating content.

The method entails automatically inferring new metadata from the content and from existing metadata and automatically annotating the content with the new metadata. New metadata generated using this method can be used to improve the relevancy of the search results and enhance the search and navigation experience for the end-user of the computing device.

Yet another aspect of the invention provides a method for semantically searching content, the method comprising displaying a first facet and a second facet as part of faceted search results in response to a search query, associating a first facet with a second facet in response to user input, and searching a semantic index based on the first and second facets by cross-referencing metadata for the content associated with the first facet with metadata for the content associated with the second facet.

Yet a further aspect of the invention provides a semantic navigation system comprising an ingestion broker for ingesting content from client systems, a web crawler operatively connected to the ingestion broker for crawling web content for the ingestion broker, an engine for operating a semantic index, a content analytics module operatively connected to the engine for analyzing content to generate semantic metadata for the semantic index, and a presentation module having presentation logic for presenting search results obtained by querying the semantic index. The presentation module includes a widget server and a template engine that allow widgets to be aggregated into a theme. A theme is designed to address specific business needs. A complete semantic search and navigation application can be made of one or several themes.

Various techniques including normalization of entities and categories may be used. Fine tuning of the relevancy and the document ranking can be accomplished by applying boosts to different types of metadata.

Another aspect of the invention provides a non-transitory computer-readable medium upon which are stored instructions in code that are configured to perform any one of the foregoing methods when the computer-readable medium is loaded into memory and executed on a processor of a computing device.

The details and particulars of these aspects of the invention will now be described below, by way of example, with reference to the attached drawings.

DETAILED DESCRIPTION

Embodiments of the invention, which are described below, enable various new techniques pertaining to the generation of semantically enriched content and to semantic search and navigation. As will be elaborated below, the invention provides innovative tools for managing and delivering content.

By way of overview, and to place the invention in its proper context, the invention should be understood as being part of one or more processes of creating semantically-enriched content and searching semantically (semantic navigation). In general, there are five main stages or processes: (1) normalizing data content, (2) enriching the data content by semantic annotations, (3) storing the data content, (4) enhancing the search and navigation experience with faceting and (5) retrieving or delivering the enriched data content in response to search queries and/or facet based filters. In the first stage, data is normalized from a variety of different sources such as, for example, crawled Web pages, CMS, blogs, forums, XML formats, text, PDF documents or MS Office documents. In the second stage, the data content is enriched by creating facets, such as, for example, people, places, organizations, concepts, categories, summaries or sentiments. In the third stage, the data content is stored in one or more of a number of different forms such as, for example, as articles, products, bios, reviews, etc. In the fourth and fifth stages, the enriched data content is retrieved or delivered in the form of, for example, a site search, topic pages, widgets, syndication, etc.

With faceted search results, the user can rapidly navigate to other content that may be of interest. Existing structured metadata in the content and the automatically extracted metadata may be stored as facets for every document. Facets may include people, places, organizations, similar documents, hot topics, sentiment analysis, or the like. Facets may be used to improve result relevancy, suggest related documents, create topic pages and automatically syndicate relevant and timely content.

In one implementation, searching may be enhanced by a similar-document search (i.e., a search for documents that are "similar to document X"). Alternatively, in another implementation, the interface may enable a search for an "alternative results set" in which the handler returns documents that are potentially related to the search query even if they do not contain the search terms.

Semantic navigation thus increases the efficacy of a search engine by increasing the likelihood that meaningful and relevant content will be located by a search. Semantic navigation has the effect of breaking content silos and unwrapping content with an intuitive search and discovery experience.

Figure 1:
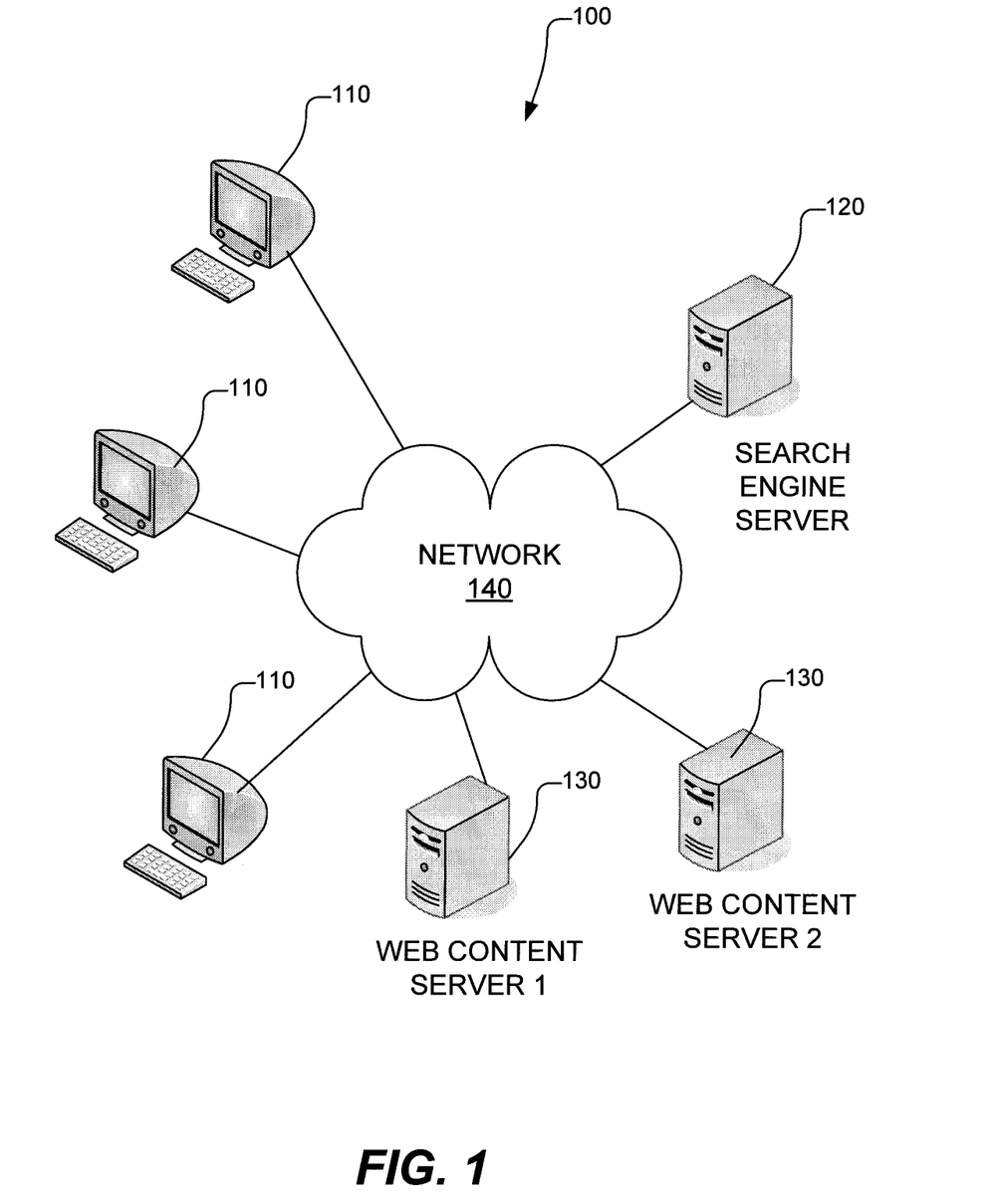
FIG. 1 is a schematic depiction of a networked computer system on which embodiments of the invention may be implemented.

FIG. 1 schematically depicts an exemplary computer network environment 100 for implementing embodiments of the invention. As illustrated, a computer-based information search system includes client computers 110 which communicate through a network 140 with a search engine server 120 to obtain information associated with a search query (which may be a structured query or a natural language query). While three client computers 110 are illustrated, any number of client computers may be in use. The client computers 110 may be geographically distributed across the network 140, collocated, or any combination thereof. While a single search engine server 120 is illustrated, it should be appreciated that the functionality of the server 120 may be distributed over multiple servers 120 which may be clustered, geographically distributed across the network 140, or any combination thereof.

A search query may be transmitted from a client computer 110 through the network 140 to the search engine server 120. The search engine server processes the natural language or structured query and searches through its index based upon syntax and/or semantics extracted from the query. Results of the search are returned from the server 120 through the network 140 to the client computer 110.

One or more search indexes (or indices) may be stored at, or in association with, the server 120. Information in a search index may be populated from a set of source information, or a document collection. For example, in a web search implementation, content may be collected and indexed from various web sites on various web servers 130 across the network 140. Such collection and indexing may be performed by software executing on the server 120 or on another computer. The collection may be performed by web crawlers or spider applications. The collected data is also ingested into a content analytics module and a semantic annotator which process the ingested information such that semantic content collected from the corpus may be indexed based on both syntax and the semantics extracted by the content analytics module.

The client computers 110 may act as terminals, hypertext browser clients, graphical display clients, or other networked clients to the server 120. For example, a web browser application at the client computers 110 may support interfacing with a web server application at the server 120. Such a browser may use controls, plug-ins, or applets to support interfacing to the server 120. The client computers 110 can also use other customized programs, applications, or modules to interface with the server 120. The client computers 110 can be desktop computers, laptops, handhelds, mobile devices, mobile telephones, television set-top boxes, kiosks, servers, terminals, thin-clients, or any other computerized devices.

The network 140 may be any communications network capable of supporting communications between the client computers 110 and the server 120. The network 140 may be wired, wireless, optical, radio, packet switched, circuit switched, or any combination thereof. The network 140 may use any topology, and links of the network 140 may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, the Internet (or the World Wide Web), a LAN, WAN, MAN, or any other network for interconnecting computers. To support high volume and load, a distributed computing environment may be implemented by using networking technologies that may include, but are not limited to, TCP/IP, RPC, RMI, HHTP, Web Services (XML-RPC, JAX-RPC, SOAP, etc.).

It should be appreciated that, in addition to the illustrated network environment, the server 120 and client computer 110 may be combined into a single computing device. Such a combined computing device can support search indexes stored locally or remotely.

Figure 2:
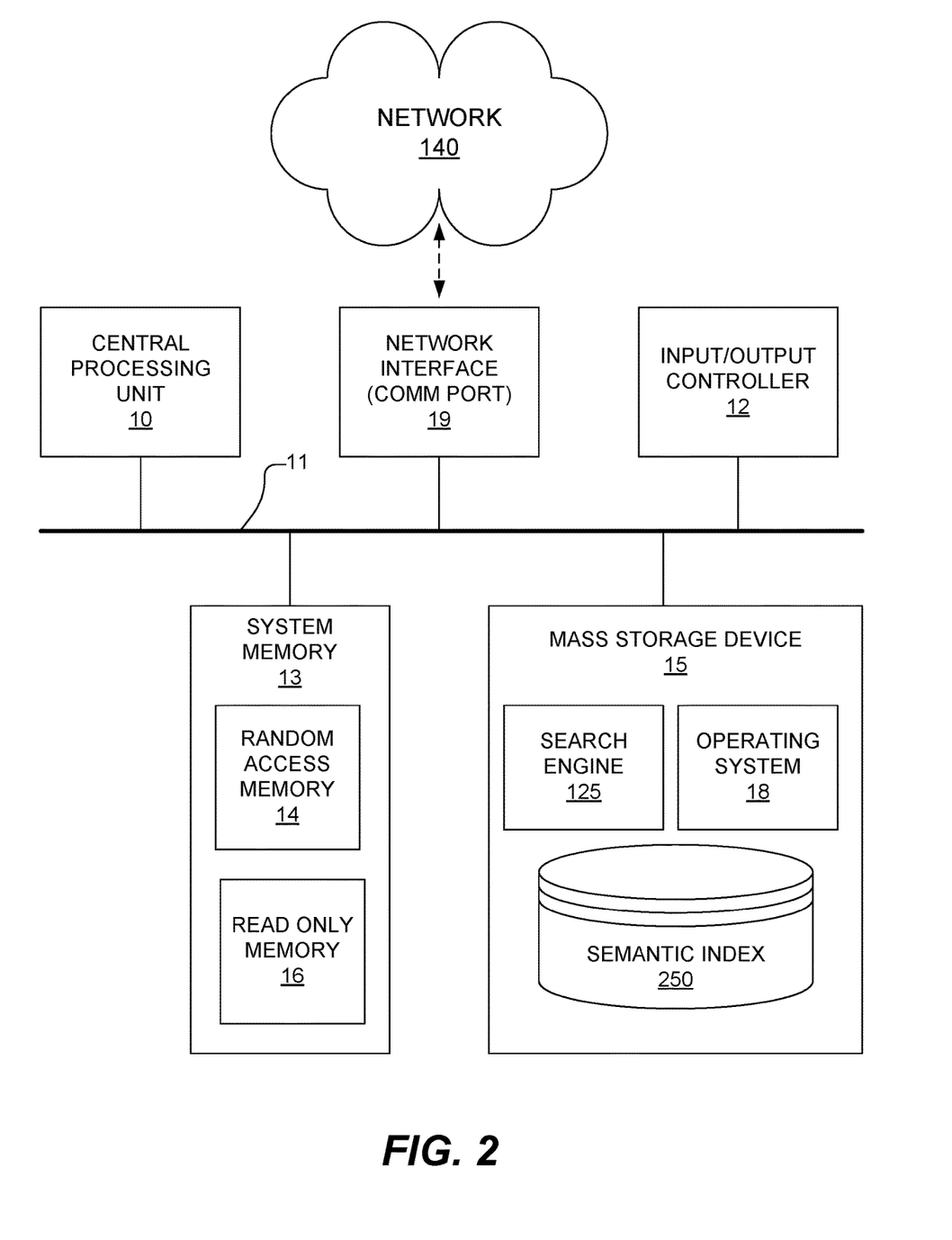
FIG. 2 is a schematic depiction of a computing device for implementing embodiments of the invention.

Turning now to FIG. 2, an exemplary computer (also referred to herein as a computing device) can execute software components and modules for creating semantically enriched content and/or for semantic search and navigation. The computer architecture shown in FIG. 2 illustrates a desktop, laptop, or server computer and may be utilized to execute aspects of the software components presented herein. It should be appreciated, however, that the described software components can also be executed on other example computing devices such as mobile devices, handheld wireless communications devices, smart phones, tablets, set-top boxes, kiosks, etc. Any one or more of the client computers 110 or server computer 120 may be implemented as the computer system illustrated in FIG. 2.

The computer illustrated in FIG. 2 can include a central processing unit 10 (CPU), also referred to herein as a processor or microprocessor, a system memory 13, including a random access memory 14 (RAM) and a read-only memory 16 (ROM), and a system bus 11 that can couple the system memory 13 to the CPU 10. A basic input/output system (BIOS) containing the basic routines that help to transfer information between elements within the computer, such as during start-up, can be stored in the ROM 16.

The computer may further include a mass storage device 15 for storing an operating system 18, software, data, and various program modules. A semantic index 250 associated with the search engine may be stored within the mass storage device 15.

The mass storage device 15 can be connected to the CPU 10 through a mass storage controller (not illustrated) which is connected to the bus 11. The mass storage device 15 and its associated computer-readable media can provide non-volatile storage for the computer. Although the description of computer-readable media contained herein refers to a mass storage device, such as a hard disk, solid-state drive or CD-ROM drive, it should be appreciated by those skilled in the art that computer-readable media can be any available non-transitory computer storage media that can be accessed by the computer.

By way of example, and not limitation, non-transitory computer-readable media may include volatile and non-volatile, removable, and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments, the computer may operate in a networked environment using logical connections to remote computers through the network 140 such as the Internet. The computer may connect to the network 140 through a network interface 19 which may be a communications port such as a DSL or cable modem, Ethernet connection, or any suitable wired or wireless switch or router, etc. The network interface 19 connected to the bus 11. It should be appreciated that the network interface unit 19 may also be utilized to connect to other types of networks and remote computer systems. The computer may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

A number of program modules and data files may be stored in the mass storage device 15 and RAM 14 of the computer, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the search engine 125 for execution by the CPU 10. The search engine 125 can include software components for implementing portions of the processes disclosed herein. The mass storage device 15, the ROM 16, and the RAM 14 may also store other types of program modules. The mass storage device 15, the ROM 16, and the RAM 14 can also store a semantic index 250 associated with the search engine.

Figure 3:
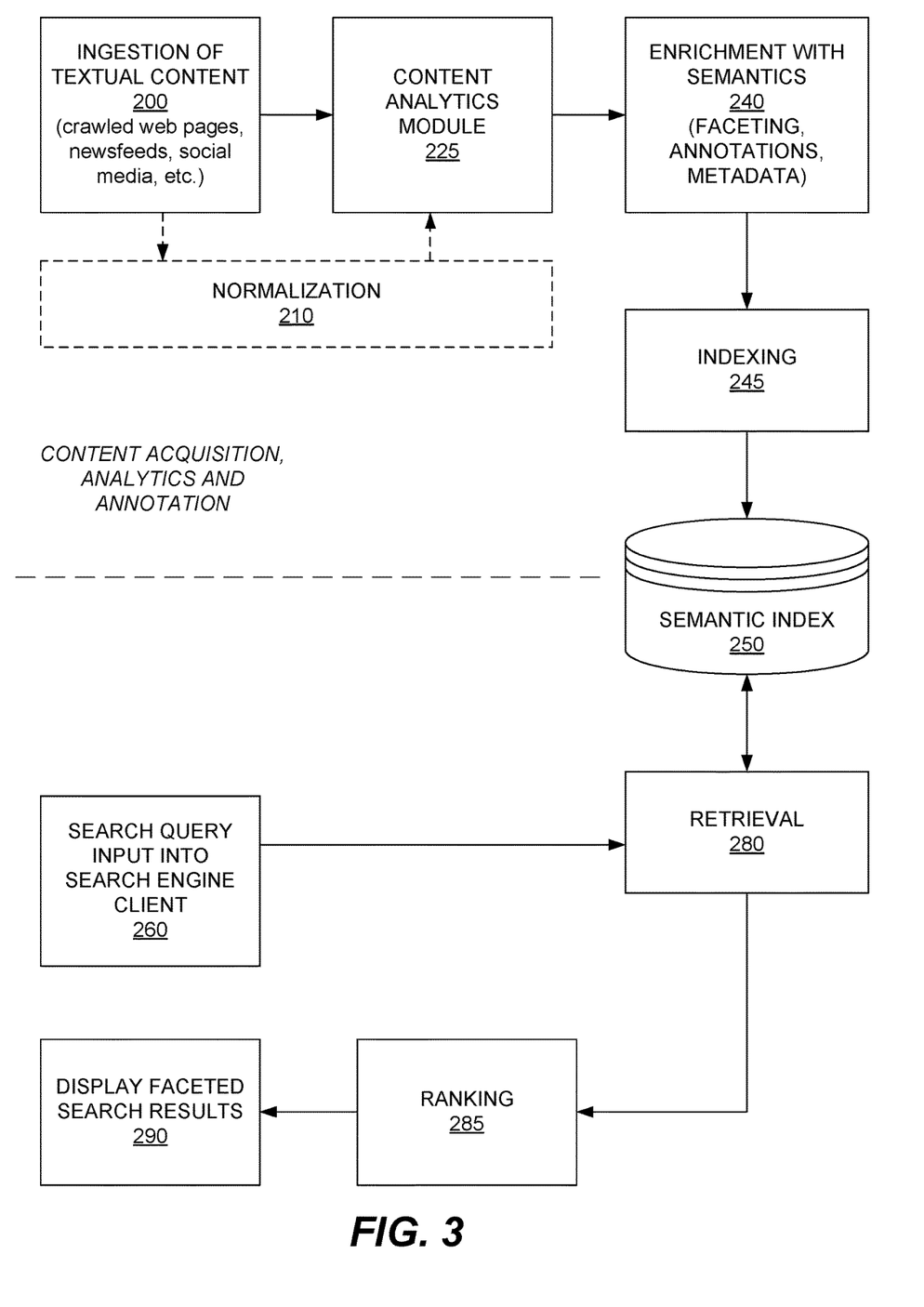
FIG. 3 is a functional block diagram illustrating a process of creating semantically enriched data by content ingestion, analytics, annotation, and indexing as well as a process for semantic search and navigation.

Referring now to FIG. 3, a functional block diagram illustrates various components for semantic content enrichment and semantic navigation according to various embodiments of the invention. As discussed above, the search engine 125 enables information searches. In order to support such searches, a content ingestion (acquisition) process is performed by an ingestion broker 200. This ingestion broker is responsible to read the source document and normalize the input format for a uniform storage into the indexes. The ingestion broker may optionally include a language detector to identify the language used in a piece of content and apply the appropriate linguistic processing. The ingestion broker may include an ingestion queue (document queue) with a logging module (for generating logs) and a document/batch prioritization module (where documents in the queue are pending, processed, failed, rejected, or skipped). Operations related to content acquisition/ingestion extract information from documents provided as text content. This may include extracting keywords from full-text parsing and/or from meta-data. The ingestion broker may include configurable and extensible ingestion pipeline with parsers for packages (zip, tar, etc.), transformers for documents (transforming to any arbitrary format to XML), processors for fields (date, encoding, etc.). As depicted in FIG. 3, a normalization process 210 is performed to normalize content from a variety of different sources and formats, e.g. crawled web pages, feeds, blogs, MS Office documents, PDF's, etc. By generating clean XML, the enriched content may be delivered across multiple digital channels for a variety of end-user applications (e.g., mobile, port to print, syndication, etc.).

As depicted in FIG. 3, a content analytics module 225 analyzes the content using knowledge engineering and machine learning techniques and may perform one or more of the following functions: extraction of key concepts (e.g., identifying part-of-speech patterns using natural language processing algorithms), extraction of entities (e.g., places, people, organizations, products), categorization (identification of main topics) and classification, sentiment analysis (including subjectivity and tonality), summarization, similarity analysis, automatic language detection, disambiguation, and derivation of additional meaning/knowledge from the words of the text.

The content is then semantically enriched by enrichment process 240 (e.g., with a semantic annotator) by encapsulating new annotations, metadata and the like to the content. In the search and discovery experience provided by the presentation layer of the invention, these new metadata are then instantiated as facets to let the end-user navigate and refine the search criteria. Content enriched with semantic metadata makes the content vastly more findable and search-engine optimized (SEO). This semantic data can be stored in a semantic index 250 that can be used for searching. The semantic index may be part of a search index, e.g. a forward index or an inverted index. The semantic index 250 may be used in conjunction with a meta search engine (which relies on the indices of other search engines and thus does not store its own local index) or a cache-based search engine (which permanently stores the index along with the corpus). In one embodiment, the content analytics module 225 and annotator 240 may be consolidated in a text mining engine that semantically analyzes, annotates and relates data content.

Operations related to a user search are also depicted in FIG. 3. A user-input search query (e.g. a web search) entered into a search engine can take the form of a natural language question, one or more keyword(s) with implicit or explicit Boolean logic or a structural query. The search engine analyzes the user input/query and compares the query term(s) with information stored within the search index (or semantic index 250). The content and structuring of information in the semantic index 250 can support rapid matching and retrieval of documents, or portions of documents, that are relevant to the meaning of the query.

The ingestion broker may ingest a wide variety of different types of documents, e.g., web pages, textual documents, scanned documents, databases, information listings, other Internet content, or any other information source to provide a corpus of information to be searched. Normalization and content analytics may involve syntactic parsing and semantic mapping. Preliminary language processing steps may occur before, or at the beginning of parsing. For example, the text content may be separated at paragraph and/or sentence boundaries. Proper nouns may be identified as candidates for the names of particular people, places, objects or events. Also, the grammatical properties of meaningful word endings may be determined. Parsing may be performed by a shallow syntactic analysis system. The parser can convert sentences to representations that make explicit the syntactic relations among words. The parser can apply a grammar associated with the specific language in use. For example, the parser can apply a grammar for English. The grammar is formalized as a lexical functional grammar (LFG) and a Probabilistic Context-free Grammar (PCFG). The grammar can specify possible ways for constructing meaningful key phrases in a given language. The parser may apply the rules of the grammar to the strings of the text content.

A grammar may be provided for various languages. For example, LFG grammars have been created for different languages such as English, French, Spanish, German and Portuguese. Other grammars may be provided as well. A grammar is developed by manual acquisition where grammatical rules are defined by a linguist or dictionary writer. Alternatively, machine learning acquisition can involve the automated observation and analysis of many examples of text from a large corpus to automatically derive grammatical rules. A combination of manual definition and machine learning are also be used in acquiring the rules of a grammar.

During a semantic mapping process, information can be extracted from the shallow syntactic structures and combined with information about the meanings of the words in the sentence. A semantic map or semantic representation of a sentence can be provided as content semantics. Semantic mapping can augment the syntactic relationships provided by the parser with conceptual properties of individual words. The results can be transformed into representations of the meaning of sentences from the text content. Semantic mapping can determine roles played by words in a sentence. For example, the subject performing an action, something used to carry out the action, or something being affected by the action. For the purposes of indexing, words can be stored in a semantic index 250 along with their roles. Thus, retrieval from the semantic index 250 can depend not merely on a word in isolation, but also on the meaning of the word in the sentences in which it appears within the text content. Semantic mapping can support disambiguation of terms, determination of antecedent relationships, and expansion of terms by synonym, hypernym, or hyponym.

An index can represent a large corpus of information so that the locations of words and phrases can be rapidly identified within the index. A traditional search engine may use keywords as search terms such that the index maps from keywords specified by a user to articles or documents where those keywords appear. The semantic index 250 can represent the semantic meanings of words in addition to the words themselves. Semantic relationships can be assigned to words during both content acquisition by ingestion broker 200 and user search. Queries against the semantic index 250 can be based on not only words, but words in specific roles, with specific properties or relationships. The roles are those played by the word in the sentence or phrase as stored in the semantic index 250. The semantic index 250 can be considered an inverted index that is a rapidly searchable database whose entries are semantic words (i.e., word in a given role) with pointers to the documents, or web pages, on which those words occur. The semantic index 250 can support hybrid indexing. Such hybrid indexing can combine features and functions of both keyword indexing and semantic indexing.

User entry of queries (input of search query 260) can be supported in the form of keywords or structural queries. Optionally, the query can be processed for semantics. The semantic mapping of the query can also provide semantics to be used in a retrieval process 280 against the semantic index 250. The retrieval process 280 can support hybrid index queries where both keyword index retrieval and semantic index retrieval may be provided alone or in combination.

In response to a search query, results of retrieval 280 from the semantic index 250 can inform a ranking process 285. Ranking can leverage both keyword and semantic information. During ranking 285, the results obtained by retrieval 280 can be ordered by various metrics in an attempt to place the most desirable results closer to the top of the retrieved information to be provided to the user as a search result presentation 290. The results may be presented as faceted search results, as illustrated by way of example in FIG. 4-6. Faceted search results made by presented by the search engine client application on the client computer 110.

Figure 4:
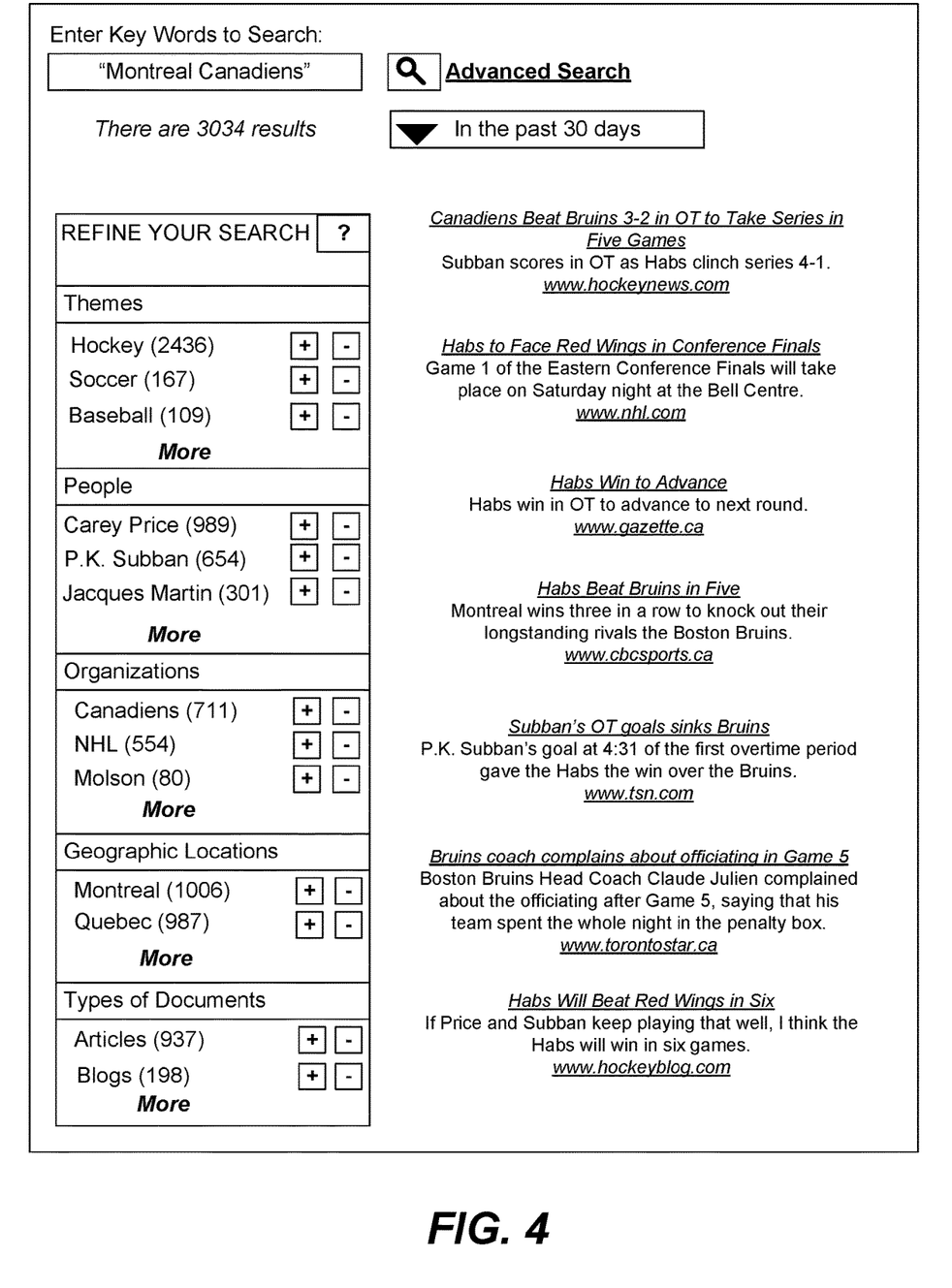
FIG. 4 is a depiction of a semantic navigation user interface for presenting faceted search results in accordance with one embodiment of the invention.

FIG. 4 depicts an improved search engine interface with faceted search results in accordance with one embodiment of the invention. In addition to the standard search query field and search result list, the search engine interface depicted by way of example in FIG. 4 displays a plurality of facets. In this example, the facets are presented along the left side of the screen. For example, the facets depicted are Themes, People, Organizations, Geographic Locations and Types of Documents. The layout, number, and order of the facets and the specific names of the facets are presented solely to illustrate the concept. Other layouts, numbers, orders or names of facets may of course be dynamically displayed.

Under each facet are a plurality of subjects, topics or names (e.g., specific names of people, specific place names, and specific names of organizations, etc.). These are referred to herein as faceted search results. In other words, each facet triggers its own faceted search results. The number of faceted search results that are displayed for each facet is of course variable. An optional link, virtual button or other such user interface element may be provided to enable the user to view additional faceted search results. In the example depicted in FIG. 4, a link entitled "More" is provided to enable the user to cause the device to display more results.

As depicted in the example presented in FIG. 4, faceted search results are presented in the search engine interface in response to a query for the professional hockey team "Montreal Canadians". The facets (themes, organizations, locations, and document types) each can trigger faceted search results if the user adds them as criteria to navigate, refine or filter the current result set. For themes (or topics), there are, for example, different types of sports. For organizations, there are, for example, different players or coaches associated with the team. For locations, there are, for example, a city (e.g., Montreal) and a province (e.g., Quebec). For document types, there are, for example, articles and blogs.

Using knowledge engineering techniques, each single facet can be dynamically filtered at indexing time or even at query time. Both filtering approaches improve overall precision of the facets and search results. However, dynamically filtering at query time provides an added benefit that content does not need to be re-classified.

The user may click, touch or otherwise select any one of the faceted search results (e.g., the listed subjects, topics, names, etc. under each facet) to obtain content relevant to that particular subject, topic or name.

Beside each faceted search result, as shown by way of example in FIG. 4, is a user interface element for including that faceted search result as a search term in a subsequent search (for example, it may use a filter query or optionally perform a Boolean logical AND with the original search query although the filter query is generally considered to be better since it does not impact the ordering when sorting by relevancy). Also displayed in association with each faceted search result is a user interface element for excluding that faceted search result as a search term (e.g., by using a filter query that does not affect ordering based on relevancy or optionally performing a Boolean logical AND NOT with the original search query). In the example depicted in FIG. 4, the user interface for including a faceted search result as a search term in a further search is a virtual button marked with a plus sign whereas the user interface element for excluding a faceted search result as a search term in a further search is a virtual button marked with a minus sign.

In the example depicted in FIG. 4, each faceted search result under each facet has its own pair of user interface elements to include or exclude that particular faceted search result in a further search. Beside each category in each facet is a user interface element that enables the user to select to include or exclude that facet from the search results. A first user interface element may be a virtual button with a first symbol such as a plus sign (+) that enables the user to include that element (faceted search result) in a subsequent search. A second user interface element may be a virtual button with a second symbol such as a minus (−) sign to enable the user to exclude that element (faceted search result) from the subsequent search.

FIG. 4 is thus an example of a semantic faceted site search in which facets are presented in response to the search query (in addition to the standard list of relevancy-ranked search results). As will be elaborated below, the user interface elements associated with each of the faceted search results facilitate semantic navigation by enabling the user to refine the search query and thus the search results based on one or more of the facets and to navigate to more relevant content. As will be also elaborated below in greater detail, the invention also provides a method and system for automatically and dynamically identifying semantic facets within unstructured portions of the content while ingesting the content into the search indices.

This novel presentation layer depicted by way of example in FIG. 4 provides a richer, more ergonomic user experience, facilitates interaction between the user and other available content, and improves the likelihood that the user will find relevant information. Semantic faceted navigation provides a novel method to explore and discover semantically related content in a large document collection. Thus, semantic faceted navigation is useful not only for search per se but also for exploration of the document collection.

Figure 5:
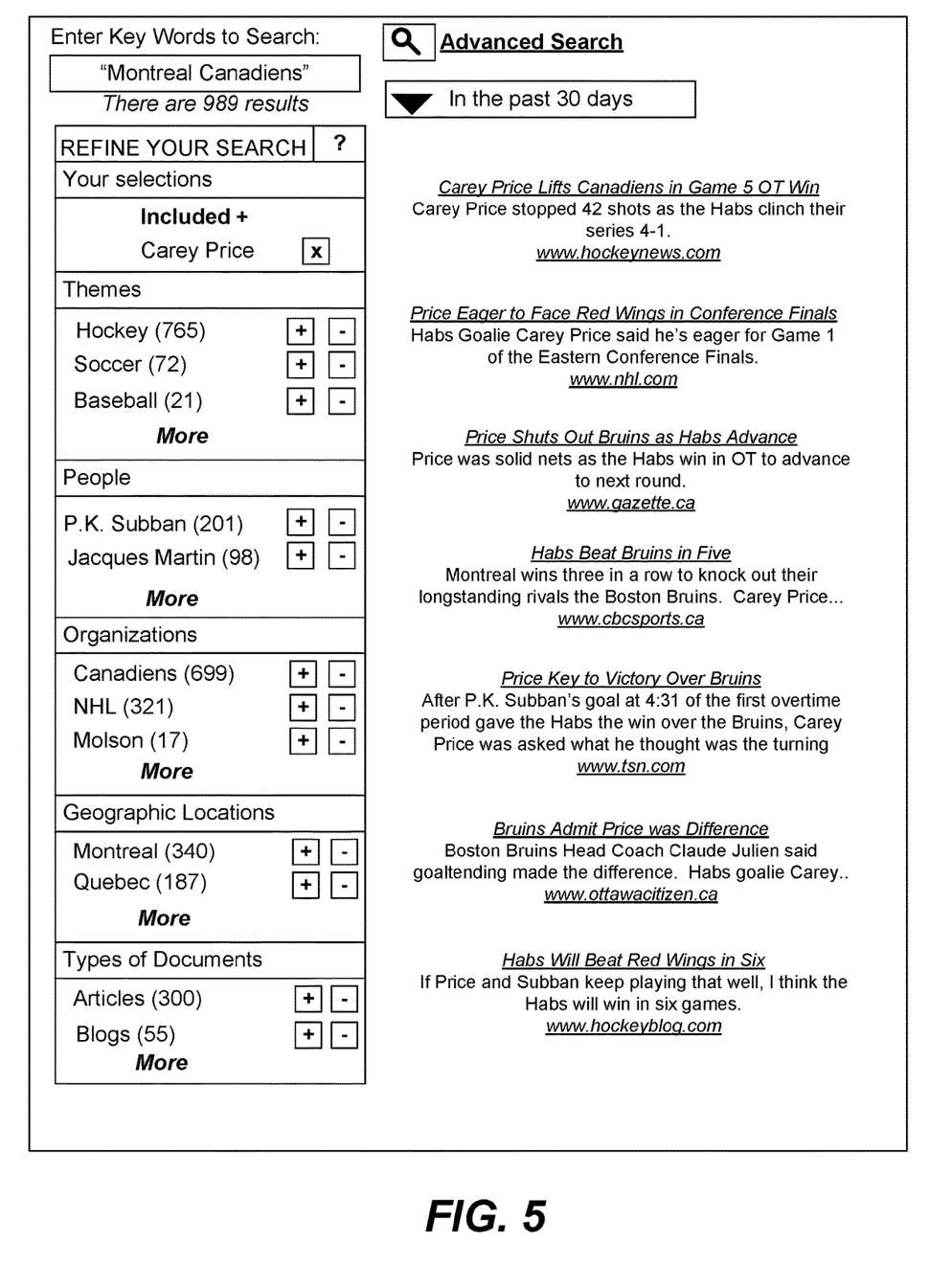
FIG. 5 is a depiction of a further user interface after a user has included a faceted element to refine the search of FIG. 4.

Upon selection of the plus or minus signs, a new selection summary box may be displayed as shown in FIG. 5. This selection summary box provides the status of the refined search parameters, i.e. which elements are included and which are excluded. This refined search box may include a user interface element next to each search term to enable the user to deselect the search term. This may be a virtual button with an X, for example, as shown in the figure. The selection summary is updated each time a further selection is made to include or exclude a faceted search result as a search term.

Figure 6:
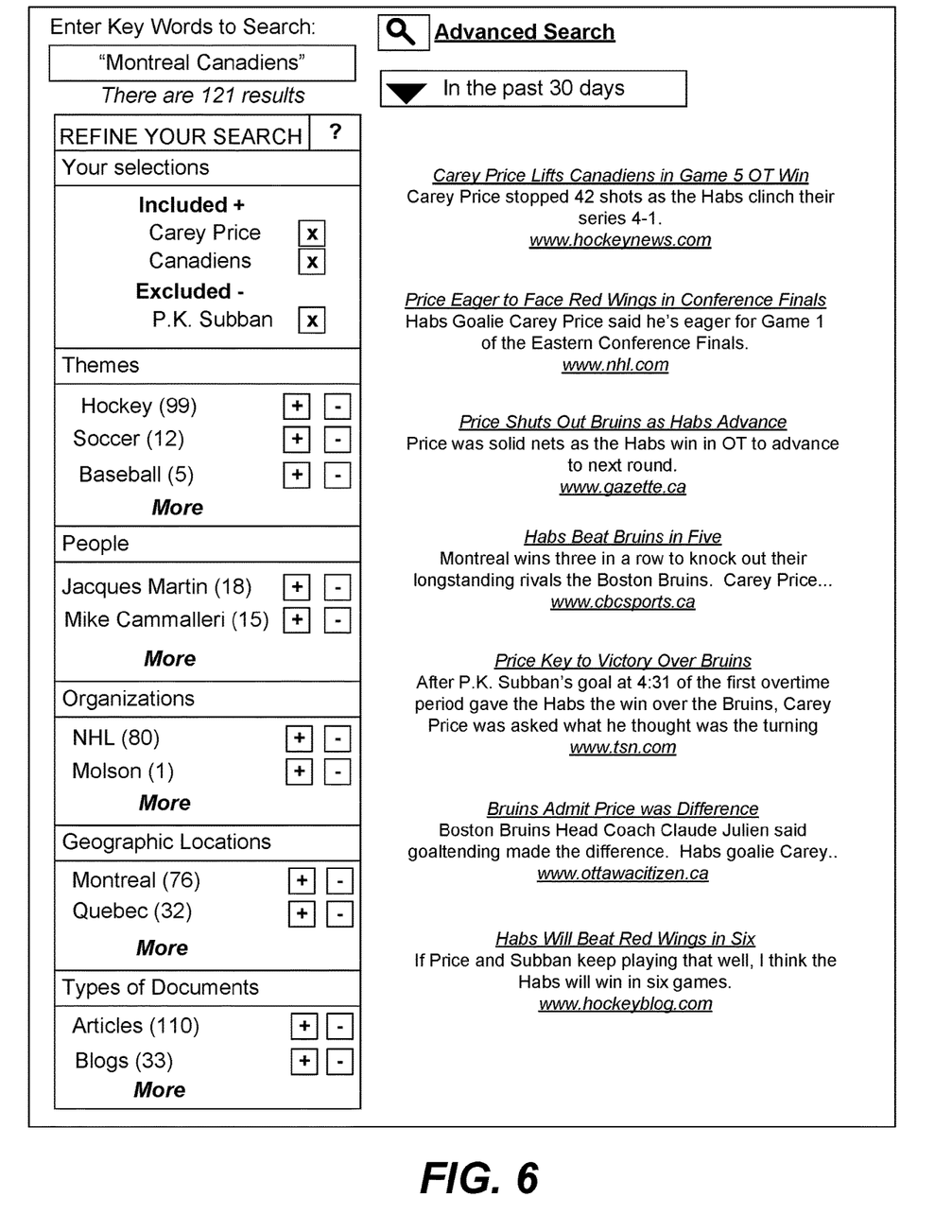
FIG. 6 is a depiction of yet a further interface after the user has further included a faceted element and excluded another faceted element to further refine the search of FIG. 5.

FIG. 6 depicts the search engine interface after two faceted search results have been selected for inclusion and after one faceted search result has been selected for exclusion. The selection summary box shows the current status of the search query.

As depicted in FIGS. 4-6, one aspect of the invention provides a method of displaying search results on a computing device. In general terms, this method entails receiving search results in response to a search query, displaying a list of search results in a search engine interface, and displaying a plurality of editorial and semantic facets in the search engine interface, each of the facets comprising faceted search results, each of the faceted search results being displayed in association with user interface elements for including or excluding the faceted search result as additional search terms to subsequently refine the search query.

Displaying search results may optionally include displaying, for one or more of the displayed search results, a list of metadata. Displayed metadata may be editorial or manually annotated metadata or it may be automatically extracted metadata. This displayed metadata may relate to concepts, entities, summaries, etc. The displayed metadata provides a quick overview as well as another way to navigate into the collection.

The invention disclosed herein confers a number of advantages, such as generally improving the search experience and enabling web site owners and web-based content providers to improve the retention rate. In addition, the invention can be used to achieve better organic search engine optimization (SEO) and potentially greater advertising revenue.

Figure 7:
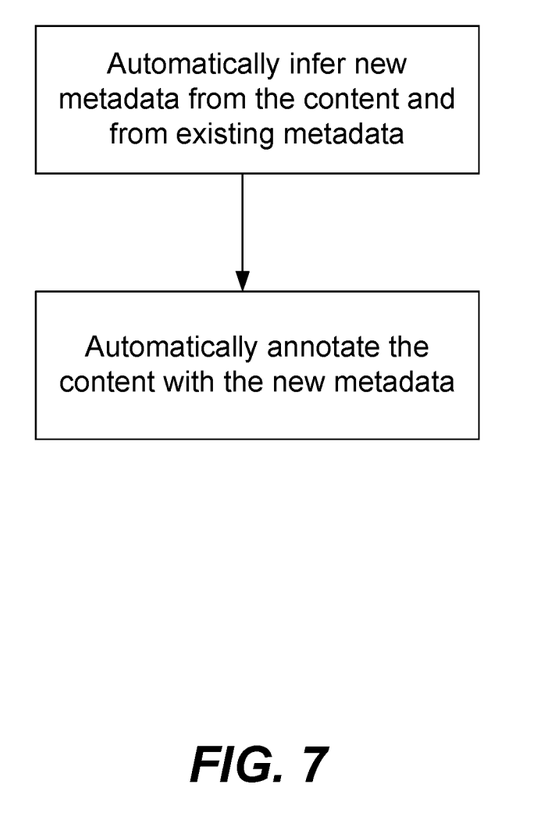
FIG. 7 is a flowchart depicting steps of a method of annotating content generating metadata by inferring new metadata from the content and from existing metadata.

With reference to FIG. 7, another aspect of the invention provides an inference technique that permits the indexation of inferred metadata to improve findability. For example, consider a Web page about an event in Stockholm where the term "Sweden" is not mentioned in the content. A visitor searching for "event Sweden" will thus, usually conventional content search technology, receive zero hits. With the invention, however, an inference is made at indexing time that the place name "Stockholm" refers to the capital of Sweden; this inference "Sweden" is thus added as derived or inferred metadata. This logic can be generalized to any kind of entity type where a parent/child relationship is involved (e.g. holonym/meronym, hyperonym/hyponym). Inferred metadata is automatically generated and automatically added as annotations to the content. This approach is somewhat comparable to automated query expansion but, in this novel implementation, the method involves semantically enriching content at indexing time instead of doing it at query time.

In one implementation, semantic pivots (which are based on co-occurrence) may be utilized as a tool to combine different types of semantic facets to further refine search criteria using semantic facet associations. Pivots may be useful for sentiment analysis and other applications.

This novel association technique leverages semantic metadata extracted from the unstructured content and makes it possible to display advanced facets where two facets are linked together. For example, by using this approach, the semantic navigation experience can provide facets to drill down the content using advanced criteria like "display only documents in which Acme Corp is mentioned in a negative context" (reciprocal relationship between a company name and sentiment analysis) or "only documents where a politician is involved in a trial" (reciprocal relationship between a "person type" and a topic). Pivoted facets offer the user a novel way to refine a search using criteria similar to what could be obtained using a natural query language. Broadly stated, this method for semantically searching content comprises displaying a first facet and a second facet as part of faceted search results in response to a search query, associating a first facet with a second facet in response to user input and searching a semantic index based on the first and second facets by cross-referencing metadata for the content associated with the first facet with metadata for the content associated with the second facet. For example, an ingested document describing a politician "John Doe" is inferred to be a document about a "politician" even if the phrase "politician" does not appear in the document. This semantic metadata "politician" is added to the index to point to the ingested document about John Doe. Another ingested document may describe, for example, a court proceeding from which the semantic metadata "trial" is inferred. Associating the facets "politician" and "trial" creates a pivoted faceted search for both concepts. The search cross-references the semantic metadata from each of the different facets to make further semantically-based connections or associations. Thus, the search results for the facet "politicians" may be refined by searching the metadata of this content for anything semantically related to "trials". The faceted search may be pivoted by inverting one facet with the other facet. For example, the pivoted search would search the metadata of the content under the facet "trials" for semantic references to "politicians".

Figure 8:
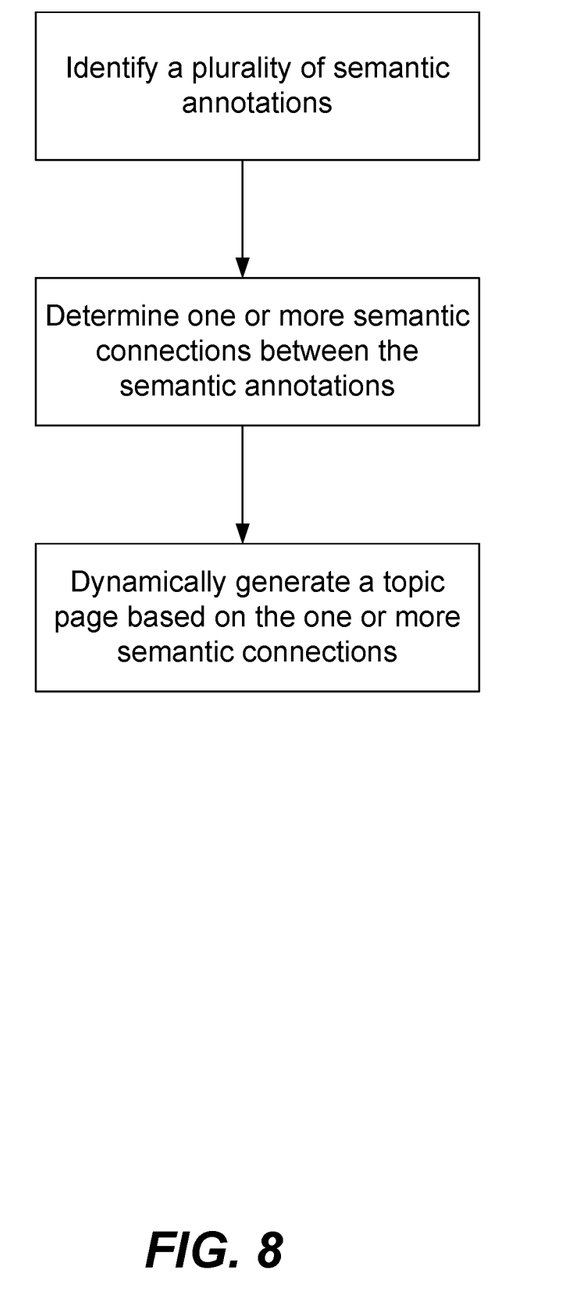
FIG. 8 is a flowchart depicting steps of a method of dynamically generating a topic page based on semantic connections made between annotations.

With reference to FIG. 8, another aspect of the invention provides a method for dynamically generating topic pages based on semantic connections built from semantic annotations. In other words, topic pages may be created by inferring or deriving semantic metadata and then performing a similarity analysis on the semantic metadata to thereby associate and aggregate similar content for the topic page. This method thus involves providing semantic annotations for a plurality of content presented on a web page, determining semantic connections from the semantic annotations, and then dynamically generating topic pages about a topic, a celebrity (person attribute), a company or a product for example. Using this technique, a topic page does not need to be populated manually with content. Based on the existing semantic annotations and connections stored in the index, the system is able to generate such pages on demand. Editorial placement rules can also be applied to topic pages in order to promote specific assets based on the user query and/or the criteria used to generate the topic page.

Figure 9:
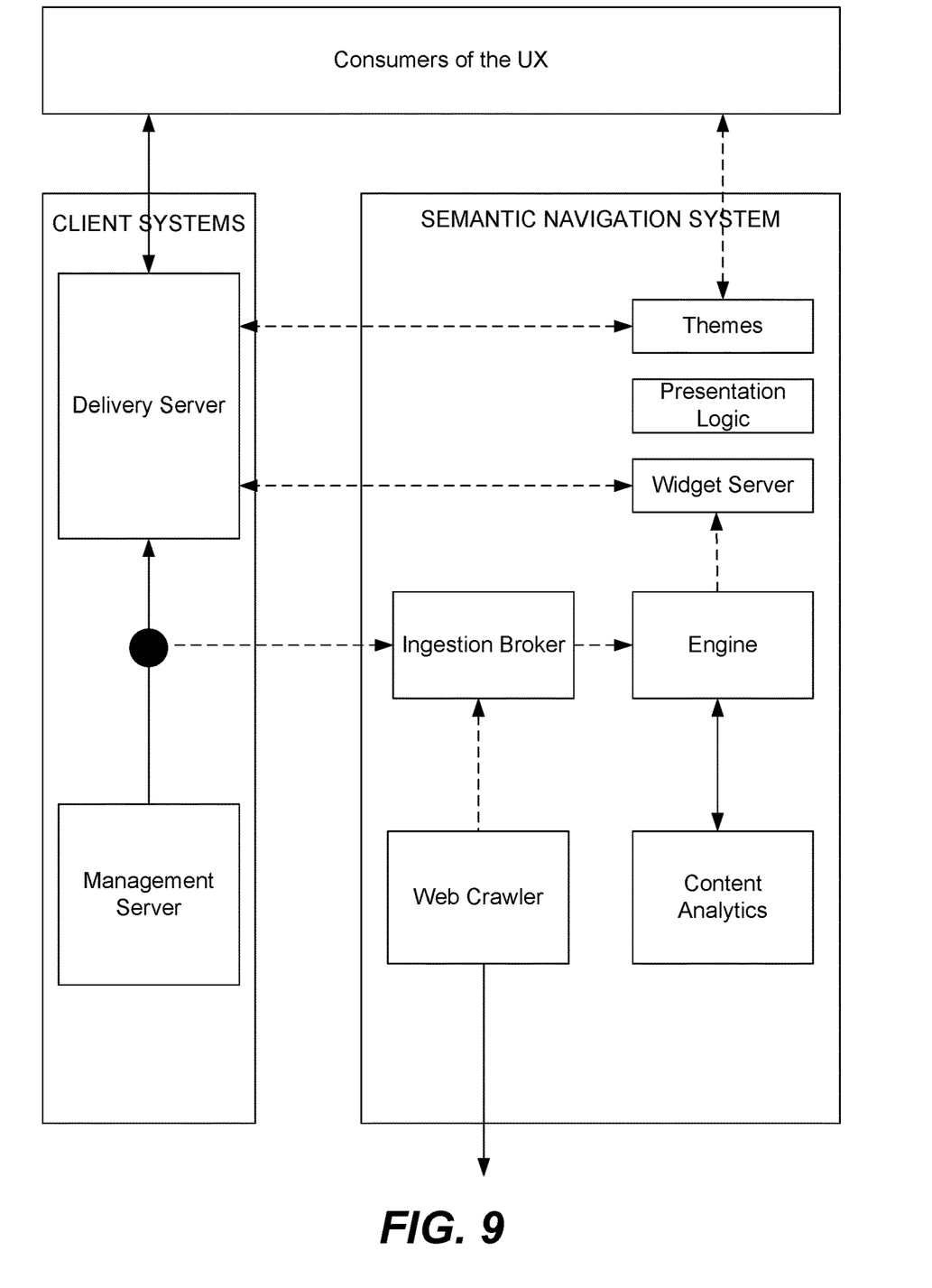
FIG. 9 is a schematic depiction of a semantic navigation system in accordance with one implementation of the invention.

An exemplary implementation of a semantic navigation system is depicted schematically in FIG. 9. As depicted by way of example in FIG. 9, the semantic navigation system includes a number of modules or components. As illustrated in this schematic figure, the system includes a built-in web crawler (which may include be preconfigured with ready-to-use crawling sample configurations). The system depicted in FIG. 9 also includes an ingestion broker, an index engine, a content analytics module, and a presentation module having presentation logic, themes and a widget server. The system interacts with client systems and consumers of the user experience as depicted schematically in FIG. 9.

The ingestion broker provides functionalities to ingest, parse, process, normalize and store documents into the index. In one embodiment, the ingestion broker supports extraction of textual content from static or binary files (like PDF and Microsoft Office documents) in the ingestion queue, and also supports chaining of transformers and processors. During the ingestion process, the engine can also call a content analytics module or any third-party text annotator in order to enrich documents with semantic annotations before they are indexed. The content analytics module may be configured to supply several types of semantic annotations for documents, provide keywords and normalized facets which are then stored into the indices operated by the (index) engine. In another implementation, another (e.g. third-party) semantic annotator may be used instead of the content analytics module.

As depicted by way of example in FIG. 9, the system includes the core engine which operates the search indexes. The core engine may include one or more query-time handlers. These handlers may perform query dispatching. These handlers may optionally enable editorial and advertisement (forced) placements, facet cleanup, and other features such as semantic similarity analysis (adapted from the "more-like-this" algorithm). The engine may have preconfigured (ready-to-use) schemas and configurations for indexes in various languages such as, for example, English, French, Spanish, German and Portuguese. In one embodiment, facet attributes may be stored in the index as facets or sub-facets (for pivoted faceting). In one implementation, the core engine is tightly integrated with the content analytics. Configurable content analytic profiles (round-robin and calls) may be provided. Optionally, file-system persistence of semantic metadata enables fast re-indexing.

In a faceted search implementation, each document is associated with a list of facets (i.e. categories that it belongs to). Those facets (categories) are stored as document attributes within the search index. During the search for a specific query, the facets of all matched documents are retrieved using the index. The retrieved facets may then be used by the searcher to narrow his search to a specific facet.

A presentation module has presentation logic for implementing a presentation framework/layer that is responsible for the user interface (UI) rendering. The presentation logic uses themes, templates and widgets which may be configured to control how the content is rendered for viewing by end users.

As illustrated in FIG. 9, the presentation module may include preconfigured (ready-to-use) themes (which may be built with a template-based system) and a library for creating different presentations and layouts, e.g., for faceted search results, topic pages, mobile search, etc. A themes folder may be provided. The themes folder contains most of the UI, CSS and images contained in the rendering of the output, such as generic themes. In one embodiment, all themes share common files which are located in a common folder. Those files can be reconfigured or modified to change the themes.

As illustrated in FIG. 9, the presentation module also includes a widget server to serve consumable content fragments as non-JavaScript widgets (e.g., search results, facet compilations, trends, etc.). The fragments can be in any format (e.g., XML, RDF, JSON, HTML, etc.) and are extensible via templates. A JavaScript library is also available to enable quick and seamless inclusion of content widgets into external web pages. Widgets are provided for semantic facets, similar documents, recommended links, top searches, top-documents, did-you-mean, etc., and may be aggregated into a theme to render a specific layout and fulfill specific business needs. In one embodiment, a pivoted facets widget supports faceted sentiments, trends, and hierarchical faceting.

In one embodiment, the presentation framework includes a configurable logger which compiles a log of events in the presentation framework.

The semantic navigation system of FIG. 9 may include an optional management console (not illustrated) which provides various administrative control features through a Web application interface. Content expert features may be included such as slider-based algorithmic tweaking, schema customization and crawler configuration. Editorial features (forced placements configuration) may also be provided in this management console.

In one embodiment, the management console enables monitoring of the status of the ingestion broker(s), start/stop/restart their execution as well as copy configurations between different ingestion broker instances to ease configuration replication in a distributed environment.

In one embodiment, the management console enables management of the behaviour of multiple engines and their indexes in one convenient place. Management includes monitoring status, execution, create/remove indexes, schema management, configure editorial and advertisement placements, tune sort algorithm, index cleanup and optimization, configure semantic filtering and copy configurations between different engine instances.

In one embodiment, the management console enables an administrator to monitor the status and copy configurations between different presentation framework instances.

In one embodiment, the management console enables you to monitor the status and control the execution of content analytics instances.

Another aspect of the invention provides a method for providing a customizable developer experience (DX) with RDF-XML widget bundles. This may involve encapsulating content fragments from different non-JavaScript widgets into one single RDF-XML response. A bundle can be customized to encapsulate different sets of content fragments.

Another aspect of the invention provides a method of creating customized user interfaces using themes built from an aggregation of interconnected widgets. A widget is a fragment of (generally) structured content in any format (e.g., HTML, XML, JSON, etc.).

In one implementation, a ready-made non-JavaScript widget library (collection of widgets) is provided to quickly promote content on a site. JavaScript widgets can also be used to fetch content from external sites and thus promote content from external web sites. In the themes folder, a JavaScript snippet can be configured to fetch content and to output it on any site, in any way, in HTML format.

Any of the methods disclosed herein may be implemented in hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s). In a software implementation, software components and modules may be implemented using standard programming languages including, but not limited to, object-oriented languages (e.g., Java, C++, C#, Smalltalk, etc.), functional languages (e.g., ML, Lisp, Scheme, etc.), procedural languages (e.g., C, Pascal, Ada, Modula, etc.), scripting languages (e.g., Perl, Ruby, Python, JavaScript, VBScript, etc.), declarative languages (e.g., SQL, Prolog, etc.), or any other suitable programming language, version, extension or combination thereof.

A non-transitory computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

What is claimed is:

1. A method for semantically enriching content for semantic navigation, the method comprising:
    determining, by a computer, semantic metadata from content ingested from different sources;
    enriching, by the computer, the content with the semantic metadata, wherein the enriching comprises creating a first semantic facet from the semantic metadata;
    storing, by the computer, the first semantic facet in a semantic index;
    receiving, by the computer, a search query from a user device;
    querying, by the computer, the semantic index with the search query from the user device;
    retrieving or receiving, by the computer, results of the querying from the semantic index, wherein the results include the first semantic facet created from the semantic metadata during the enriching;
    responsive to the search query, generating a second semantic facet from the semantic metadata used during the enriching; and
    presenting, by the computer, faceted search results through a user interface on the user device, the faceted search results comprising:
        the first semantic facet of the results; and
        the second semantic facet generated from the semantic metadata.
2. The method according to claim 1, wherein the faceted search results comprise facets and wherein each facet of the facets is presented on the user interface with a plus sign and a minus sign.
3. The method according to claim 2, further comprising:
    upon selection of a plus sign corresponding to a facet of the facets presented on the user interface:
    updating the search query to include the facet as a search term;
    querying the semantic index with the search query thus updated;
    retrieving or receiving an additional faceted search result from the semantic index; and
    displaying a new selection summary box on the user interface to include the additional faceted search result.
4. The method according to claim 1, further comprising:
    providing a deselection user interface element next to each search term in the search query to enable deselection of a corresponding search term.
5. The method according to claim 4, further comprising:
    upon selection of a deselection user interface element corresponding to a search term in the search query:
        updating the search query to remove the search term from the search query; and
        querying the semantic index with the search query thus updated.
6. The method according to claim 1, wherein the search query from the user device comprises at least one of a natural language question or a keyword with implicit or explicit Boolean logic.
7. The method according to claim 1, wherein the semantic index comprises a forward index or an inverted index.
8. A system for semantically enriching content for semantic navigation, the system comprising:
    a processor;
    a non-transitory computer-readable medium; and
    instructions stored on the non-transitory computer-readable medium and translatable by the processor for:
        determining semantic metadata from content ingested from different sources;
        enriching the content with the semantic metadata, wherein the enriching comprises creating a first semantic facet from the semantic metadata;
        storing the first semantic facet in a semantic index;
        receiving a search query from a user device;
        querying the semantic index with the search query from the user device;
        retrieving or receiving results of the querying from the semantic index, wherein the results include the first semantic facet created from the semantic metadata during the enriching;
        responsive to the search query, generating a second semantic facet from the semantic metadata used during the enriching; and
        presenting, by the computer, faceted search results through a user interface on the user device, the faceted search results comprising:
            the first semantic facet of the results; and
            the second semantic facet generated from the semantic metadata.
9. The system of claim 8, wherein the faceted search results comprise facets and wherein each facet of the facets is presented on the user interface with a plus sign and a minus sign.
10. The system of claim 9, wherein the instructions are further translatable by the processor for:
    upon selection of a plus sign corresponding to a facet of the facets presented on the user interface:
    updating the search query to include the facet as a search term;
    querying the semantic index with the search query thus updated;
    retrieving or receiving an additional faceted search result from the semantic index; and
    displaying a new selection summary box on the user interface to include the additional faceted search result.
11. The system of claim 8, wherein the instructions are further translatable by the processor for:
    providing a deselection user interface element next to each search term in the search query to enable deselection of a corresponding search term.

12. The system of claim 11, wherein the instructions are further translatable by the processor for:
    upon selection of a deselection user interface element corresponding to a search term in the search query:
        updating the search query to remove the search term from the search query; and
        querying the semantic index with the search query thus updated.

13. The system of claim 8, wherein the search query from the user device comprises at least one of a natural language question or a keyword with implicit or explicit Boolean logic.

14. The system of claim 8, wherein the semantic index comprises a forward index or an inverted index.

15. A computer program product for semantically enriching content for semantic navigation, the computer program product comprising a non-transitory computer-readable medium storing instructions translatable by a processor for:
    determining semantic metadata from content ingested from different sources;
    enriching the content with the semantic metadata, wherein the enriching comprises creating a first semantic facet from the semantic metadata;
    storing the first semantic facet in a semantic index;
    receiving a search query from a user device;
    querying the semantic index with the search query from the user device;
    retrieving or receiving results of the querying from the semantic index, wherein the results include the first semantic facet created from the semantic metadata during the enriching; responsive to the search query, generating a second semantic facet from the semantic metadata used during the enriching; and
    presenting, by the computer, faceted search results through a user interface on the user device, the faceted search results comprising:
        the first semantic facet of the results; and
        the second semantic facet generated from the semantic metadata.

16. The computer program product of claim 15, wherein the faceted search results comprise facets and wherein each facet of the facets is presented on the user interface with a plus sign and a minus sign.

17. The computer program product of claim 16, wherein the instructions are further translatable by the processor for:
    upon selection of a plus sign corresponding to a facet of the facets presented on the user interface:
        updating the search query to include the facet as a search term;
        querying the semantic index with the search query thus updated;
        retrieving or receiving an additional faceted search result from the semantic index; and
        displaying a new selection summary box on the user interface to include the additional faceted search result.

18. The computer program product of claim 15, wherein the instructions are further translatable by the processor for:
    providing a deselection user interface element next to each search term in the search query to enable deselection of a corresponding search term.

19. The computer program product of claim 18, wherein the instructions are further translatable by the processor for:
    upon selection of a deselection user interface element corresponding to a search term in the search query:
        updating the search query to remove the search term from the search query; and
        querying the semantic index with the search query thus updated.

20. The computer program product of claim 15, wherein the search query from the user device comprises at least one of a natural language question or a keyword with implicit or explicit Boolean logic.

* * * * *